US010393494B2

(12) United States Patent
Izaki

(10) Patent No.: US 10,393,494 B2
(45) Date of Patent: Aug. 27, 2019

(54) STRAIGHTNESS CHECKING METHOD

(71) Applicant: FANUC CORPORATION, Yamanashi (JP)

(72) Inventor: Makoto Izaki, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

(21) Appl. No.: 16/004,470

(22) Filed: Jun. 11, 2018

(65) Prior Publication Data

US 2019/0025038 A1 Jan. 24, 2019

(30) Foreign Application Priority Data

Jul. 19, 2017 (JP) ................................ 2017-139708

(51) Int. Cl.
*G01B 5/25* (2006.01)

(52) U.S. Cl.
CPC ..................................... *G01B 5/25* (2013.01)

(58) Field of Classification Search
CPC ................................... G01B 5/25; G01B 5/24
USPC ........ 33/533, 1 LE, 413, 645, 1 Q, 651, 405
See application file for complete search history.

(56) References Cited

U.S. PATENT DOCUMENTS 3,983,635 A * 10/1976 Jarman ................ G01B 5/0025 33/288
4,324,048 A * 4/1982 Frost .................. B23K 37/0435 33/651
4,884,889 A 12/1989 Beckwith, Jr.
6,329,585 B1 * 12/2001 Chono ..................... G10C 3/12 84/423 R
6,421,926 B1 * 7/2002 Cappuccio .............. E01C 23/01 33/1 H
8,291,606 B2 * 10/2012 Miller ................. E04G 21/1825 33/1 LE
2002/0029486 A1 * 3/2002 Uchiyama ............ H05K 3/0008 33/645
2002/0073571 A1 * 6/2002 Brannon, Sr. .......... G01C 15/00 33/809
2008/0256810 A1 * 10/2008 Akihary .............. E04G 21/1833 33/1 N
2011/0247226 A1 * 10/2011 Essel ................... E04G 21/1825 33/404

(Continued)

FOREIGN PATENT DOCUMENTS

JP S57-190411 U 12/1982
JP S61-033364 A 2/1986

(Continued)

*Primary Examiner* — Christopher W Fulton
(74) *Attorney, Agent, or Firm* — Studebaker & Brackett PC

(57) ABSTRACT

A straightness checking method includes the steps of standing a pin at each of both edge portions of linear members of a plurality of linearly-disposed components, and also standing a cut-out pin formed to have a cut-out on a part of a side face thereof, at an intermediate portion between the both edge portions, fixing one end portion and the other end portion of a line member respectively to the pins stood at the both edge portions, bringing into contact with the intermediate portion of the line member an uncut side face part corresponding to a side face without the cut-out formed of the cut-out pin, and rotating the cut-out pin and checking whether or not the line member vibrates due to rotation of the cut-out pin.

3 Claims, 10 Drawing Sheets

(56) References Cited

U.S. PATENT DOCUMENTS

2012/0246957 A1* 10/2012 Daniel .................. A47G 1/205
33/645

FOREIGN PATENT DOCUMENTS

JP 06185963 A * 7/1994
JP 2007-292663 A 11/2007

* cited by examiner

STRAIGHTNESS CHECKING METHOD

This application is based on and claims the benefit of priority from Japanese Patent Application No. 2017-139708, filed on 19 Jul. 2017, the content of which is incorporated herein by reference.

BACKGROUND OF THE INVENTION

Field of the Invention

The present invention relates to a straightness checking method of a plurality of components disposed linearly.

Related Art

In one of the methods of checking straightness, the contact state with respect to a linearly stretched string and a pin is checked by visual observation. In this method, the straightness is checked by visual determination about whether or not the linearly stretched string is in a so-called zero touch state in which the string is in one-point-contact, not pressed against the pin.

Leveling used when a foundation of a building is constructed is conventionally known as the method. In the method of leveling, a bar-shaped jig body having a male screw on the peripheral surface thereof is held by a support on a mold at the reference portion which is seemed to be the highest in the concrete poured into the mold. The lower end portion of the bar-shaped jig body is brought into contact with the top end of the concrete, and a nut-shaped fixing body to be screwed to the male screw formed on the peripheral surface of the jig body is fixed so as to be aligned with a leveling string. Then, the scale which is provided on the jig body and corresponds to the position of the upper surface of the fixing body is read, thereby recognizing the position of the top end of the concrete relative to the leveling string at the reference portion. Then, the jig body is being moved together with the support along the mold. When the lower end portion of the jig body is separated from the top end of the concrete, top leveling material is poured into that position to obtain the same height of the top end of the concrete as that of the reference portion, and with repeating such work the top end of the concrete is leveled.

Patent Document 1: Japanese Unexamined Utility Model Application, Publication No. S57-190411

SUMMARY OF THE INVENTION

It is difficult to visually check the zero touch state as described above, and thus it is difficult to actually use visual checking for checking the straightness of an apparatus configured with, for example, a plurality of components disposed linearly.

Although such a leveling method as disclosed in the above publication is known, the method is not available as is to check the straightness of an apparatus configured with a plurality of components disposed linearly.

The object of the present invention is to provide the straightness checking method capable of checking the straightness of a plurality of components disposed linearly.

(1) In a straightness checking method of the present invention, a plurality of components (for example, rail axis parts 10, 30 described below) respectively having linear members (for example, longitudinal direction plate members 13, 33 described below) are disposed so that the linear members are disposed mutually linearly, and then straightness of the linear members is checked. The straightness checking method includes the steps of standing a pin (for example, a pin 51 described below) at each of both edge portions of the linear members of the plurality of linearly-disposed components to be checked as to straightness, and also standing a cut-out pin (for example, a cut-out pin 52 described below) formed to have a cut-out (for example, a cut-out 523 described below) on a part of the side face thereof, at an intermediate portion between the both edge portions, fixing one end portion and the other end portion of a line member (for example, a string 61 described below) respectively to the pins stood at the both edge portions, bringing into contact with the intermediate portion of the line member an uncut side face part (for example, an uncut side face part 524 described below) corresponding to a side face without the cut-out formed of the cut-out pin, and rotating the cut-out pin and checking whether or not the line member vibrates due to rotation of the cut-out pin.

(2) In the straightness checking method according to (1), the uncut side face part may have various diameters in an axial direction of the cut-out pin (for example, a cut-out pin 52A described below). In the step of bringing the uncut side face part into contact with the intermediate portion of the line member, in the case where a portion (for example, a tip-side half portion 526A described below) of the uncut side face part having a first diameter is apart from and not in contact with the line member, a position of the uncut side face part may be changed in the axial direction of the cut-out pin in order to bring into contact with the line member a portion (for example, a base-side half portion 525A described below) of the uncut side face part having a second diameter, and then the portion of the uncut side face part (for example, an uncut side face part 524A described below) having the second diameter may be brought into contact with the line member.

(3) In the straightness checking method according to (1) or (2), a target to be checked as to straightness may be an apparatus (for example, a rail axis 1 described below) configured with the plurality of components linearly disposed so that the linear members are disposed mutually linearly.

The present invention enables to provide the straightness checking method capable of checking straightness of a plurality of components disposed linearly.

DETAILED DESCRIPTION OF THE INVENTION

An embodiment of the present invention will be described below in detail with reference to the drawings. First, a description is given of the rail axis 1 including a plurality of rail axis parts 10, 30 to be checked as to straightness in the straightness checking method according to the present embodiment.

Figure 1:
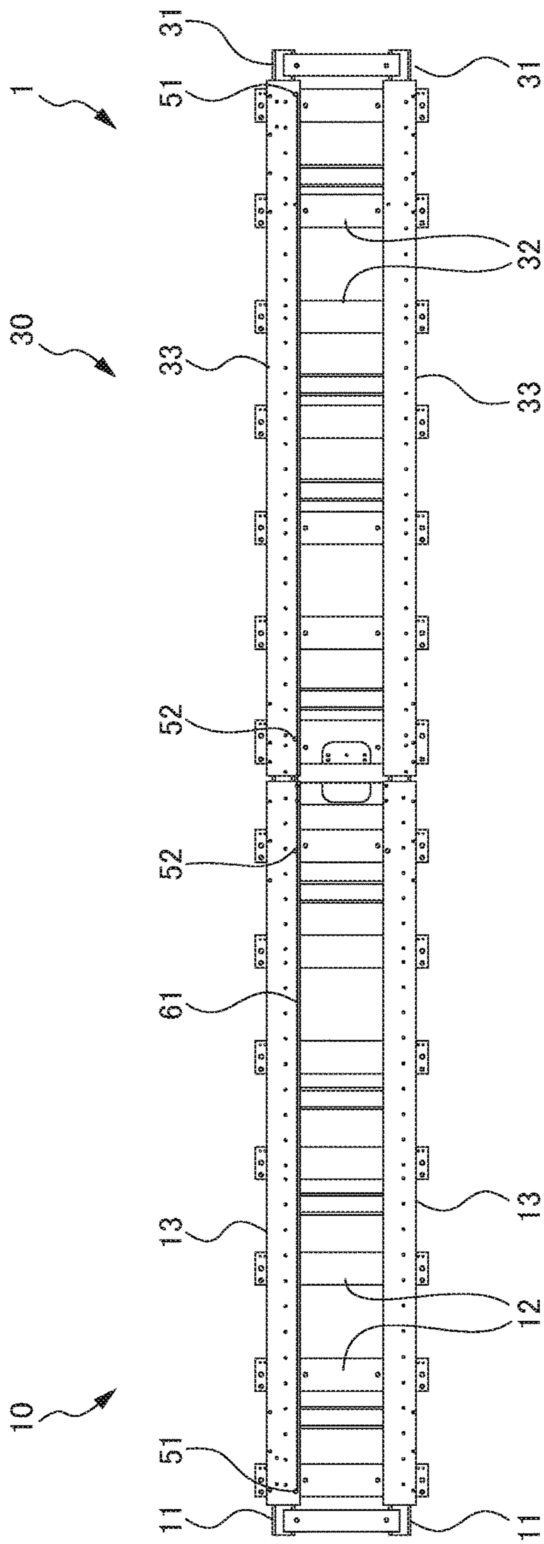
FIG. 1 is a plan view illustrating a rail axis 1 to be checked as to straightness by a straightness checking method according to a first embodiment of the present invention.

In the rail axis 1, the plurality of rail axis parts 10, 30, which are the components of the rail axis 1, are disposed. In an example, two of the rail axis parts are linearly disposed for use as shown in FIG. 1. An LM guide runs on the rail axis 1. Since the two rail axis parts 10, 30 have the same configuration, the description will be mainly given below of the rail axis part 10 disposed on the left side of FIG. 1, and the description is omitted of the rail axis part 30 disposed on the right side of FIG. 1. FIG. 1 is a plan view illustrating the rail axis 1 to be checked as to straightness by the straightness checking method according to the first embodiment of the present invention.

The rail axis parts 10, 30 respectively include two square steel pipes 11, 31, width direction plate members 12, 32, and longitudinal direction plate members 13, 33. The two square steel pipes 11 are disposed in parallel. The width direction plate member 12 is fixed so as to be laid across the two square steel pipes 11. The longitudinal direction plate members 13 are fixed to the edge parts of the width direction plate member 12, so as to be disposed parallel to the two square steel pipes 11 and to be respectively laid over the two square steel pipes 11.

Figure 2:
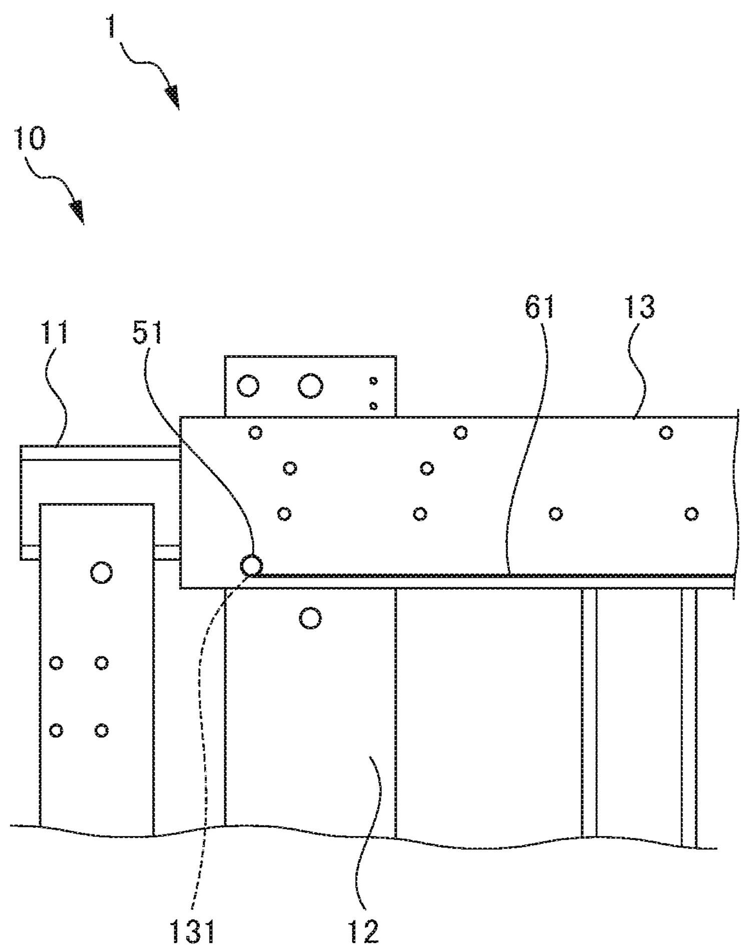
FIG. 2 is an enlarged plan view illustrating one end portion of the plurality of rail axes 1 to be checked as to straightness by the straightness checking method according to the first embodiment of the present invention.
Figure 3:
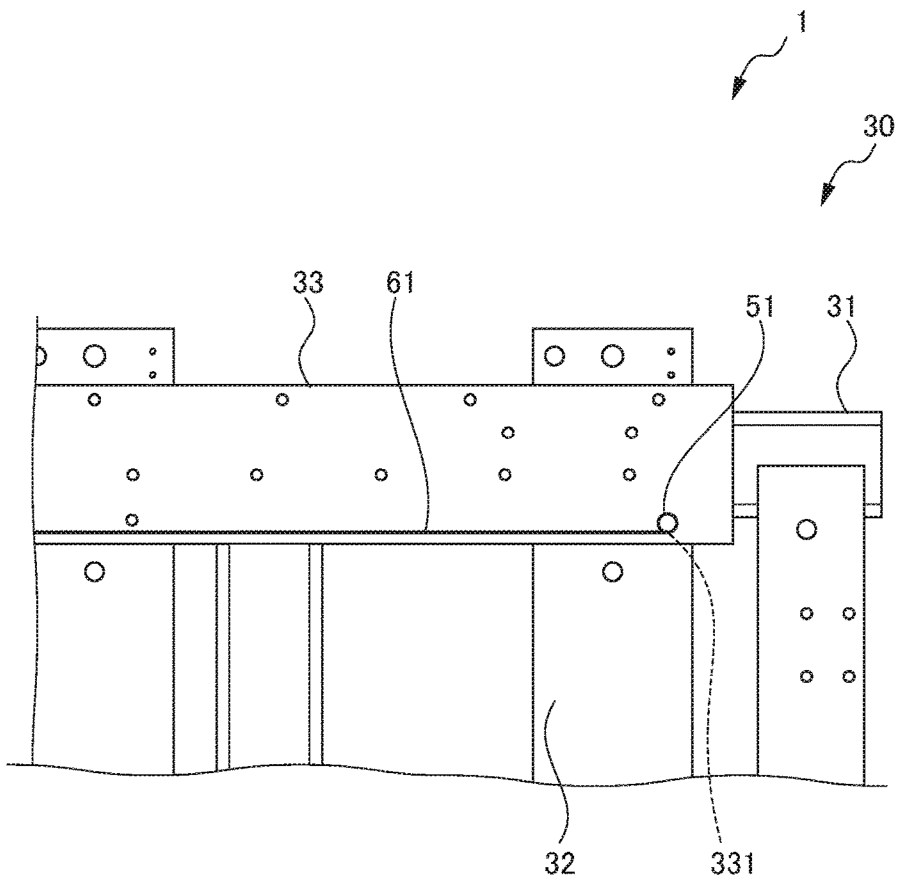
FIG. 3 is an enlarged plan view illustrating the other end portion of the plurality of rail axes 1 to be checked as to straightness by the straightness checking method according to the first embodiment of the present invention.
Figure 4:
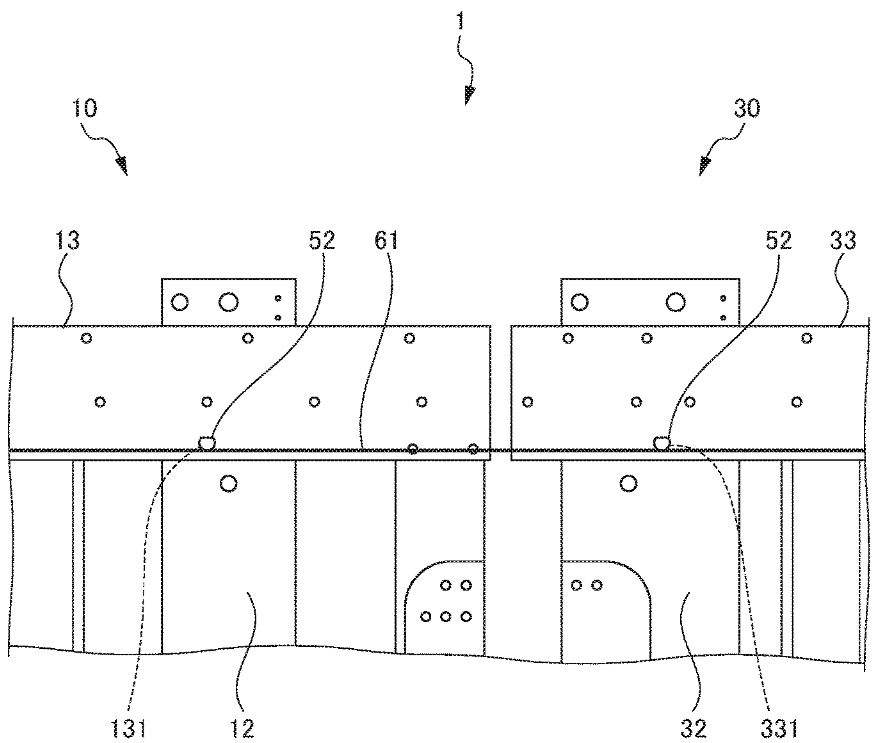
FIG. 4 is an enlarged plan view illustrating the central portion of the plurality of rail axes 1 to be checked as to straightness by the straightness checking method according to the first embodiment of the present invention.

As shown in FIG. 2 to FIG. 4, a plurality of holes 131 are formed on the longitudinal direction plate members 13. The holes 131 are formed parallel to the longitudinal direction of the longitudinal direction plate members 13. On the longitudinal direction plate member 13, each row of the holes 131 is formed with high accuracy within a predetermined tolerance at a position separated by a predetermined distance from the edge in the width direction of the longitudinal direction plate member 13. FIG. 2 is an enlarged plan view illustrating one end portion of the plurality of rail axes 1 to be checked as to straightness by the straightness checking method according to the first embodiment of the present invention. FIG. 3 is an enlarged plan view illustrating the other end portion of the plurality of rail axes 1 to be checked as to straightness by the straightness checking method according to the first embodiment of the present invention. FIG. 4 is an enlarged plan view illustrating the central portion of the plurality of rail axes 1 to be checked as to straightness by the straightness checking method according to the first embodiment of the present invention.

Figure 5:
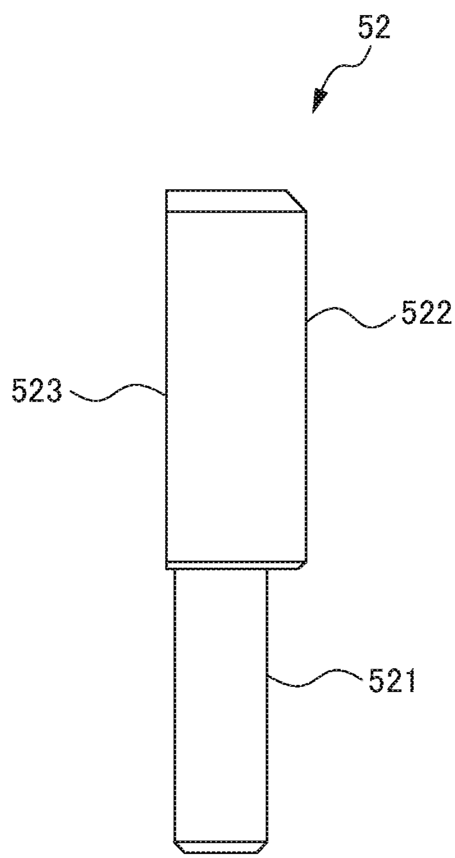
FIG. 5 is a front view illustrating a cut-out pin 52 to be fixed to the rail axis 1 in the straightness checking method according to the first embodiment of the present invention.
Figure 6:
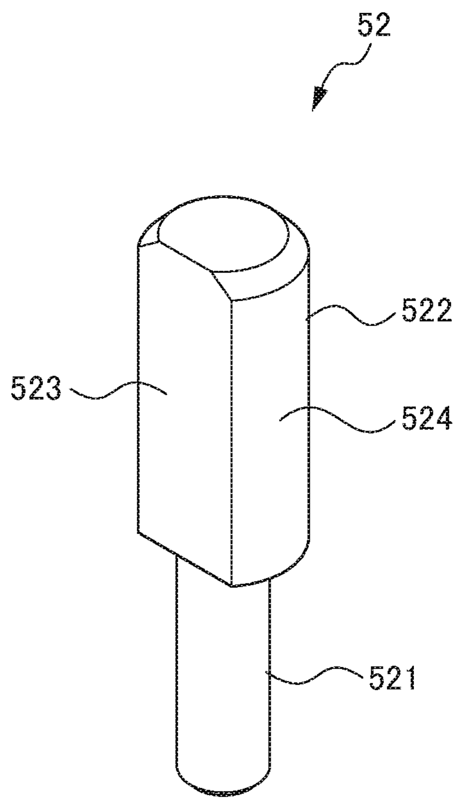
FIG. 6 is a side view illustrating a cut-out 523 of the cut-out pin 52 to be fixed to the rail axis 1 in the straightness checking method according to the first embodiment of the present invention.

The description is given below of the pin 51 and the cut-out pin 52 for use in the straightness checking method according to the present embodiment. FIG. 5 is a front view illustrating the cut-out pin 52 to be fixed to the rail axis 1 in the straightness checking method according to the first embodiment of the present invention. FIG. 6 is a side view illustrating the cut-out 523 of the cut-out pin 52 to be fixed to the rail axis 1 in the straightness checking method according to the first embodiment of the present invention. As shown in FIG. 5 and FIG. 6, the cut-out pin 52 has a base part 521 to be fixed in the hole 131 (refer to FIG. 4 and other figures) or the like, and a tip part 522 to be contacted with the string 61. The base part 521, which is formed in a cylindrical shape, is inserted into the hole 131 (refer to FIG. 4) formed at a portion on the longitudinal direction plate member 13 in the vicinity of the center in FIG. 1, and is fixed to the longitudinal direction plate member 13.

The tip part 522, which is formed in a cylindrical shape having a larger diameter than the base part 521, is in the positional relation such that the axis center thereof is aligned with that of the base part 521. The cut-out 523 is formed on one part of the tip part 522, in such a shape that one part of the side face of the tip part 522 is cut out parallel to the axial center of the cut-out pin 52. As shown in FIG. 5, when viewed from a direction parallel to the flat face of the portion of the cut-out 523, the cut-out 523 is cut at a depth not reaching the base part 521.

Figure 7:
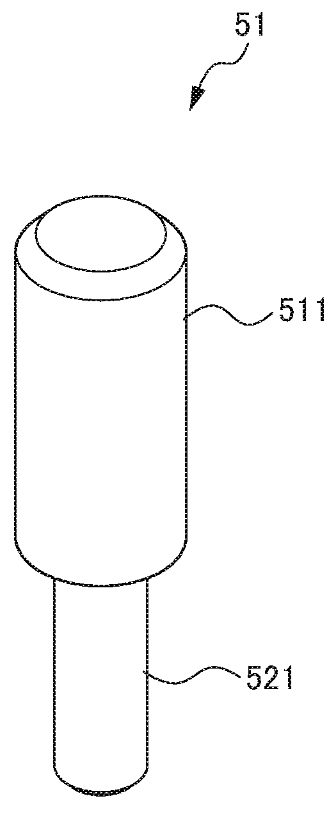
FIG. 7 is a side view illustrating a pin 51 to be fixed to the rail axis 1 in the straightness checking method according to the first embodiment of the present invention.

As shown in FIG. 7, the pin 51 has the base part 521 and a tip part 511 like the cut-out pin 52, but the shape of the tip part 511 is different from that of the tip part 522 of the cut-out pin 52. Other configurations than the tip part 511 are the same as those of the cut-out pin 52. Thus, the same reference numerals are imparted to the same configurations, and the description thereof is omitted. Specifically, the tip part 511 of the pin 51 is formed in a cylindrical shape without the cut-out 523. FIG. 7 is a side view illustrating the pin 51 to be fixed to the rail axis 1 in the straightness checking method according to the first embodiment of the present invention.

Figure 8:
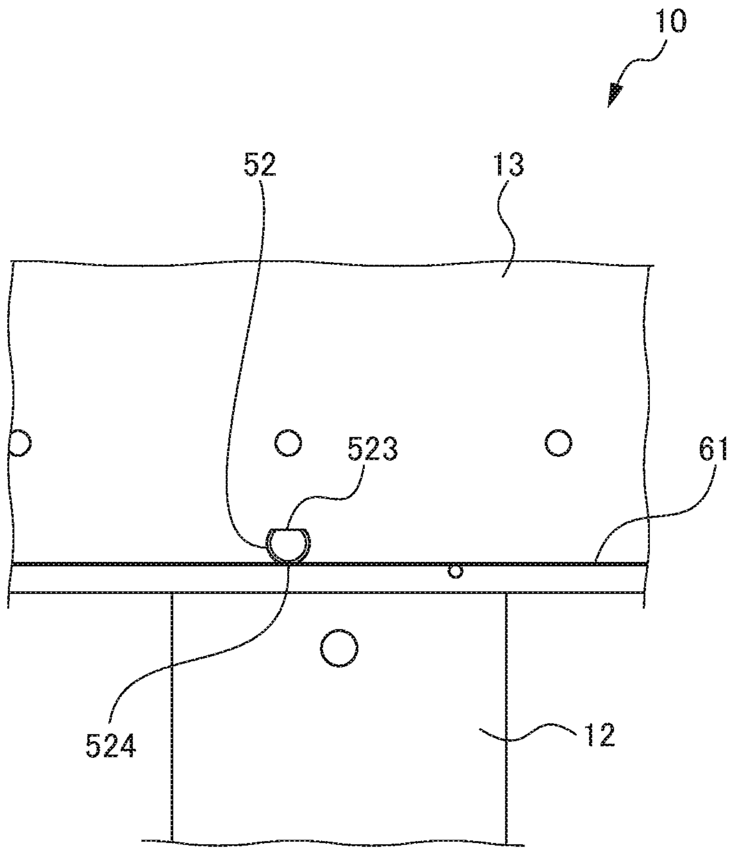
FIG. 8 is a plan view illustrating the state in which an uncut side face part 524 of the cut-out pin 52 is in contact with a string 61 in the straightness checking method according to the first embodiment of the present invention.
Figure 9:
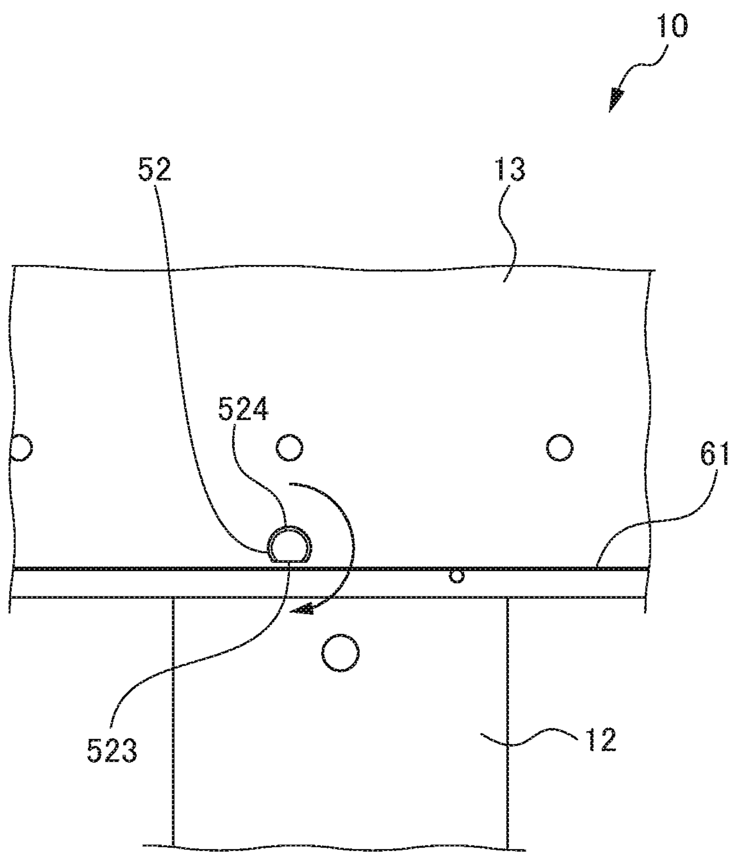
FIG. 9 is a plan view illustrating the state in which the cut-out 523 of the cut-out pin 52 faces the string 61 in the straightness checking method according to the first embodiment of the present invention.

The straightness checking method is described below. In the present embodiment, the plurality of rail axis parts 10, 30 respectively having the longitudinal direction plate members 13, 33 each having a linear shape are disposed so that the longitudinal direction plate members 13 and the longitudinal direction plate members 33 are disposed mutually linearly, and then straightness is checked between the longitudinal direction plate members 13, 33. FIG. 8 is a plan view illustrating the state in which the uncut side face part 524 of the cut-out pin 52 is in contact with the string 61 in the straightness checking method according to the first embodiment of the present invention. FIG. 9 is a plan view illustrating the state in which the cut-out 523 of the cut-out pin 52 faces the string 61 in the straightness checking method according to the first embodiment of the present invention.

In the straightness checking method, the first step is to stand the pins 51 and the cut-out pins 52. In the step of standing the pins 51 and the cut-out pins 52, firstly, the rail axis parts 10, 30 included in the rail axis 1 to be checked as to straightness are conveyed by a crane or the like to be disposed substantially linearly. More specifically, the two rail axis parts 10, 30 are disposed so that the square steel pipes 11 of one of the rail axis part 10 and the square steel pipes 31 of the other of the rail axis part 30 are disposed linearly, and the longitudinal direction plate members 13 of the one of the rail axis part 10 and the longitudinal direction plate members 33 of the other of the rail axis part 30 are disposed linearly.

Secondly, the pins 51 and the cut-out pins 52 are stood in the holes 131 of the longitudinal direction plate members 13 and holes 331 of the longitudinal direction plate members 33. Specifically, the pins 51 are stood in such a manner that the base parts 521 of the pins 51 are inserted into the holes 131, 331 (refer to FIG. 2 and FIG. 3) formed at the portions which are positioned at both end portions of the rail axis 1 (both end portions in the left-right direction in FIG. 1) on the longitudinal direction plate members 13, 33. The cut-out pins 52 are stood in such a manner that the base parts 521 of the cut-out pins 52 are inserted into the holes 131, 331 (refer to FIG. 4) formed at the portions which are positioned at the center portions with respect to the both end portions of the rail axis 1 (both end portions in the left-right direction in FIG. 1) on the longitudinal direction plate members 13, 33. The description above is about the step of standing the pins 51 and the cut-out pins 52.

The next step is to fix, to the pins 51, one end portion and the other end portion of the string 61 serving as a line member. Specifically, one end portion of the string 61 is fixed to the pin 51 disposed at the left end portion in FIG. 1 (the pin 51 shown in FIG. 2), and the other end portion of the string 61 is fixed to the pin 51 disposed at the right end portion in FIG. 1 (the pin 51 shown in FIG. 3). As a result, the string 61 is stretched linearly.

The next step is to bring into contact with the intermediate portion of the string 61, the uncut side face part 524 corresponding to the side face part of the cut-out pin 52 on which the cut-out 523 is not formed. Specifically, the positions of the rail axis parts 10, 30 are slightly moved by hitting of the square steel pipes 11, 31 by use of a hammer or the like, whereby the intermediate portion of the string 61 is brought into contact with the uncut side face part 524 of the cut-out pin 52 by visual observation, as shown in FIG. 8.

The next step is to rotate the cut-out pin 52 and check whether or not the line member vibrates due to the rotation of the cut-out pin 52. Specifically, as shown in FIG. 9, the cut-out pin 52 is rotated, whereby the state of the uncut side face part 524 of the cut-out pin 52 in contact with the intermediate portion of the string 61 is shifted to the state of the cut-out 523 facing the string 61.

In the case where the longitudinal direction plate members 13 of the rail axis part 10 and the longitudinal direction plate members 33 of the rail axis part 30 are disposed mutually linearly with high accuracy, and the straightness thereof is high, the string 61 is in a so-called zero touch state in which the string 61 is in one-point-contact, not pressed against the uncut side face part 524 of the cut-out pin 52. Even when the cut-out pin 52 is rotated under such a state, the string 61 is not pressed against the uncut side face part 524 of the cut-out pin 52, and thus the string 61 does not vibrate enough to be visually observed. In the case where the longitudinal direction plate members 13 of the rail axis part 10 and the longitudinal direction plate members 33 of the rail axis part 30 are not disposed mutually linearly with high accuracy, and the straightness is not high, the string 61 is pressed against the uncut side face part 524 of the cut-out pin 52 to be in strong contact therewith. When the cut-out pin 52 is rotated under such a state, the string 61 slides along the uncut side face part 524 of the cut-out pin 52 under the state of being pressed against the uncut side face part 524, and thus the string 61 vibrates enough to be visually observed. An operator who disposes the rail axis parts 10, 30 checks whether or not the string 61 vibrates, thereby checking whether or not the straightness of the disposed rail axis parts 10, 30 is high. In the case where the string 61 vibrates, the square steel pipes 11, 31 are slightly moved by hitting by use of a hammer or the like, and adjusted so that the uncut side face part 524 is brought into the zero touch state with respect to the string 61, and then the rail axis parts 10, 30 are fixed to each other with bolts.

The present embodiment described above exhibits the following effects. The present embodiment provides the straightness checking method for checking straightness between the longitudinal direction plate members 13, 33, by disposing the plurality of rail axis parts 10, 30 respectively having the longitudinal direction plate members 13, 33 so that the longitudinal direction plate members 13, 33 are disposed mutually linearly. The straightness checking method includes the steps of standing the pins 51 at the both edge portions of the longitudinal direction plate members 13, 33 to be checked as to straightness, and also standing the cut-out pins 52 each formed to have the cut-out 523 on a part of the side face thereof at the intermediate portion between the both edge portions, fixing one end portion and the other end portion of the string 61 respectively to the pins 51 stood at the both edge portions, bringing the uncut side face part 524 into contact with the intermediate portion of the string 61, and rotating the cut-out pin 52 and checking whether or not the string 61 vibrates due to the rotation of the cut-out pin 52.

It is difficult to determine whether or not the string 61 is in a so-called zero touch state in which the string 61 is in one-point-contact, not pressed against the uncut side face part 524, by merely checking the contact state between the string 61 and the uncut side face part 524 by visual observation. Thus, whether or not the string 61 vibrates is checked when the cut-out pin 52 is rotated, thereby enabling to easily check whether or not the string 61 is in the zero-touch state.

The target to be checked as to straightness is the rail axis 1 which includes the plurality of rail axis parts 10, 30 linearly disposed so that the longitudinal direction plate members 13 and the longitudinal direction plate members 33 are disposed mutually linearly. As a result, sufficiently high straightness is able to be obtained with respect to the rail axis 1 which requires high straightness because an LM guide runs so that a robot or the like moves.

The second embodiment of the present invention is described below.

Figure 10:
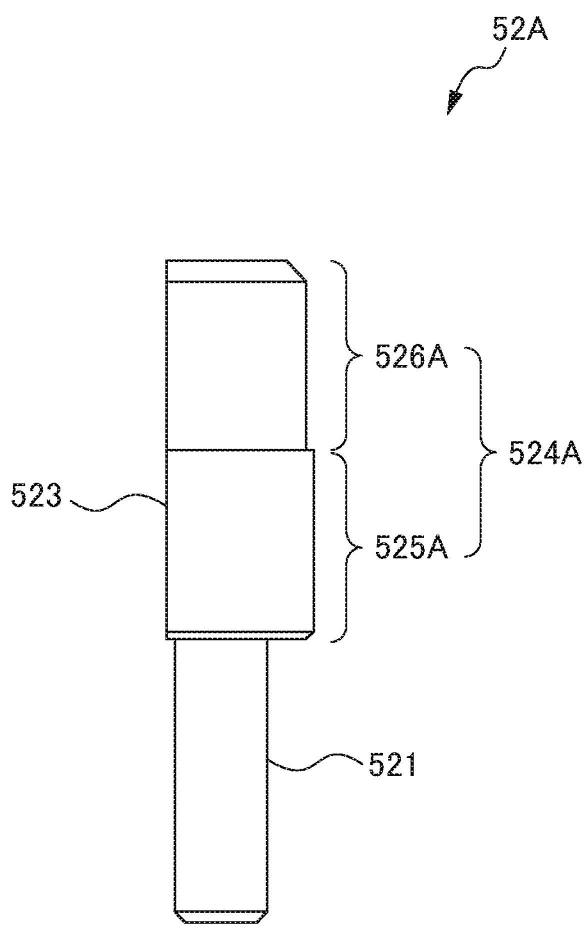
FIG. 10 is a front view illustrating a cut-out pin 52A to be fixed to the rail axis 1 in the straightness checking method according to a second embodiment of the present invention.

In the second embodiment, the configuration of the cut-out pin 52A is different from the configuration of the cut-out pin 52 in the first embodiment. This also differentiates the contents to be performed in the step of bringing an uncut side face part 524A into contact with the intermediate portion of the string 61 serving as a line member. Other configurations than the uncut side face part 524A are the same as those of the first embodiment. Thus, the description of the same configurations as those of the first embodiment is omitted. FIG. 10 is a front view illustrating the cut-out pin 52A to be fixed to the rail axis 1 in the straightness checking method according to the second embodiment of the present invention.

As shown in FIG. 10, the uncut side face part 524A has various diameters in the axial direction of the cut-out pin 52A. Specifically, a tip-side half portion 526A of the uncut side face part 524A of the cut-out pin 52A has the same radius as that of the uncut side face part 524 of the cut-out pin 52 in the first embodiment. A base-side half portion 525A connected to the base part 521 of the uncut side face part 524A of the cut-out pin 52A has a larger radius than that of the tip-side half portion 526A by a predetermined length.

In the step of bringing the uncut side face part 524A into contact with the intermediate portion of the string 61 serving as a line member in the straightness checking method, firstly, the positions of the rail axis parts 10, 30 are slightly moved by hitting of the square steel pipes 11, 31 by use of a hammer or the like as in the first embodiment, whereby the intermediate portion of the string 61 is brought into contact with the tip-side half portion 526A of the uncut side face part 524A of the cut-out pin 52A by visual observation. Secondly, the cut-out pin 52A is moved toward the axial center of the cut-out pin 52A, whereby the intermediate portion of the string 61 is brought into contact with the base-side half portion 525A of the uncut side face part 524A of the cut-out pin 52A by visual observation.

At this time, in the case where the intermediate portion of the string 61 appears to be in contact with the tip-side half portion 526A of the uncut side face part 524A of the cut-out pin 52A by visual observation, but actually slightly fails to be in contact therewith and there is a gap therebetween, the string 61 may vibrate in some cases when the cut-out pin 52A is moved toward the axial center of the cut-out pin 52A.

Specifically, in the case where the shortest distance between the string 61 and the tip-side half portion 526A of the uncut side face part 524A of the cut-out pin 52A is shorter than the difference between the radiuses of the base-side half portion 525A of the uncut side face part 524A of the cut-out pin 52A and of the tip-side half portion 526A of the uncut side face part 524A of the cut-out pin 52A, the tip-side half portion 526A of the uncut side face part 524A is brought into contact with the string 61 when the cut-out pin 52A is moved toward the axial center of the cut-out pin 52A. This causes the string 61 to vibrate. On the other hand, in the case where the shortest distance between the string 61 and the tip-side half portion 526A of the uncut side face part 524A of the cut-out pin 52A is longer than the difference between the radiuses of the base-side half portion 525A of the uncut side face part 524A of the cut-out pin 52A and of the tip-side half portion 526A of the uncut side face part 524A of the cut-out pin 52A, the tip-side half portion 526A of the uncut side face part 524A is not brought into contact with the string 61 when the cut-out pin 52A is moved toward the axial center of the cut-out pin 52A. Therefore, the string 61 does not vibrate. According to the result, the determination is made as to how far the shortest distance is between the string 61 and the tip-side half portion 526A of the uncut side face part 524A of the cut-out pin 52A.

The present embodiment described above exhibits the following effects. In the present embodiment, the uncut side face part 524A has various diameters in the axial direction of the cut-out pin 52A. In the step of bringing the uncut side face part 524A into contact with the intermediate portion of the string 61, in the case where the tip-side half portion 526A of the uncut side face part 524A is apart from and not in contact with the string 61, the position of the uncut side face part 524A is changed in the axial direction of the cut-out pin 52A so that the base-side half portion 525A of the uncut side face part 524A having a different diameter is brought into contact with the string 61, thereby bringing the base-side half portion 525A of the uncut side face part 524A into contact with the string 61.

When the position of the uncut side face part 524A is changed in the axial direction of the cut-out pin 52A to bring the base-side half portion 525A of the uncut side face part 524A into contact with the string 61, how far the tip-side half portion 526A of the uncut side face part 524A is apart from the string 61 is able to be checked according to whether or not the string 61 vibrates. In the case where the base-side half portion 525A of the uncut side face part 524 contacts with the string 61 even when the tip-side half portion 526A of the uncut side face part 524A does not contact with the string 61, the straightness checking method is available after the base-side half portion 525A of the uncut side face part 524 is brought into contact with the string 61.

The present embodiments have been described above. Although the above-described embodiments are preferred embodiments of the present invention, the scope of the present invention is not limited to the above-described embodiments. Various modifications are available within a scope not deviating from the gist of the present invention. In an example, various modifications are available as described below.

In an example, although the rail axis 1 is to be checked as to straightness by the straightness checking method, the target is not limited thereto. The string 61 is used in the straightness checking method. Alternatively, any line member is available, not limited to the string 61. The configuration of each member, for example, a pin or a cut-out pin, to be used in the straightness checking method is not limited to the configuration of the pin 51 or the cut-out pin 52 in the present embodiments. Although the uncut side face part 524A has various diameters in the axial direction of the cut-out pin 52A, the configuration is not limited thereto. Other plural cut-out pins may be used, each having the uncut side face part with one diameter similarly to the cut-out pin in the first embodiment, and each having a different diameter.

EXPLANATION OF REFERENCE NUMERALS

1 RAIL AXIS
10, 30 RAIL AXIS PART (COMPONENT)
13, 33 LONGITUDINAL DIRECTION PLATE MEMBER (LINEAR MEMBER)
51 PIN
52 CUT-OUT PIN
61 STRING (LINE MEMBER)
521 BASE PART
523 CUT-OUT
524 UNCUT SIDE FACE PART
525A BASE-SIDE HALF PORTION
526A TIP-SIDE HALF PORTION

What is claimed is:

1. A straightness checking method for checking straightness between linear members, by disposing a plurality of components respectively having the linear members so that the linear members are disposed mutually linearly, the straightness checking method comprising the steps of:

standing a pin at each of both edge portions of the linear members of the plurality of linearly-disposed components to be checked as to straightness, and also standing a cut-out pin at an intermediate portion between the both edge portions, the cut-out pin being formed to have a cut-out on a part of a side face;

fixing one end portion and the other end portion of a line member respectively to the pins stood at the both edge portions;

bringing into contact with the intermediate portion of the line member an uncut side face part corresponding to a side face with no cut-out formed of the cut-out pin; and rotating the cut-out pin and checking whether or not the line member vibrates due to rotation of the cut-out pin.

2. The straightness checking method according to claim 1, wherein the uncut side face part has various diameters in an axial direction of the cut-out pin, and in the step of bringing the uncut side face part into contact with the intermediate portion of the line member, when a portion of the uncut side face part having a first diameter is apart from and not in contact with the line member, a position of the uncut side face part is changed in the axial direction of the cut-out pin in order to bring into contact with the line member a portion of the uncut side face part having a second diameter, and then the portion of the uncut side face part having the second diameter is brought into contact with the line member.

3. The straightness checking method according to claim 1, wherein a target to be checked as to straightness is an apparatus configured with the plurality of linearly-disposed components with the linear members being disposed mutually linearly.

* * * * *